US009032453B2

(12) United States Patent
Mamidwar et al.

(10) Patent No.: US 9,032,453 B2
(45) Date of Patent: *May 12, 2015

(54) METHOD AND SYSTEM FOR MULTIPLEXED TRANSPORT INTERFACE BETWEEN DEMODULATORS (DEMODS) AND SET-TOP BOX (STB) SYSTEM-ON-CHIPS (SOCS)

(71) Applicant: Broadcom Corporation, Irvine, CA (US)

(72) Inventors: Rajesh Mamidwar, San Diego, CA (US); Stephen Edward Krafft, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,452

(22) Filed: Jul. 29, 2013

(65) Prior Publication Data

US 2013/0312053 A1 Nov. 21, 2013

Related U.S. Application Data

(63) Continuation of application No. 12/909,350, filed on Oct. 21, 2010, now Pat. No. 8,499,325.

(60) Provisional application No. 61/255,468, filed on Oct. 27, 2009.

(51) Int. Cl.
*H04N 7/18* (2006.01)
*H04N 7/173* (2011.01)
(Continued)

(52) U.S. Cl.
CPC ..... *H04N 21/42615* (2013.01); *H04N 21/4263* (2013.01); *H04N 21/4383* (2013.01); *H04N 21/4385* (2013.01); *H04N 21/8547* (2013.01)

(58) Field of Classification Search
None
See application file for complete search history.

(56) References Cited

U.S. PATENT DOCUMENTS 7,027,526 B1 * 4/2006 Nehoran et al. ............... 375/316
8,031,743 B2 * 10/2011 Kuno et al. .................... 370/474
(Continued)

FOREIGN PATENT DOCUMENTS

DE 10060060 6/2002
EP 1463320 9/2004
(Continued)

OTHER PUBLICATIONS

Siebert P. Ed—Hornsby A et al.: "Hybrid Broadband/Broadcast Systems and Set-top Boxes", Bradband Multimedia Systems and Broadcasting, 2008 IEEE International Symposium on, IEEE, Piscataway, NJ, USA, Mar. 31, 2008, pp. 1-6, XP031268569, ISBN: 978-1-4244-1648-6, Chapter HBB STB Architecture.
(Continued)

*Primary Examiner* — Justin Shepard
(74) *Attorney, Agent, or Firm* — Foley & Lardner LLP; Christopher J. McKenna; Daniel E. Rose

(57) ABSTRACT

A multiplexed transport interface (MTSIF) may be utilized during communication between a demodulation module and a video processing system-on-chip (SoC). The MTSIF may enable concurrent demodulation of a plurality of input modulated video streams, via a plurality of demodulator chips within the demodulation module, by multiplexing data generated by the demodulator chips via the MTSIF during communication between the demodulator module and the video processing SoC. The MTSIF may also be utilized for communicating control signals, which may be used in controlling and/or managing operations of the demodulation module, the video processing SoC, and/or the MTSIF. Communication via the MTSIF may be synchronized. Packets communicated via the MTSIF may be timestamped. Timestamp counters may be used in the demodulation module and the video processing SoC to generate and/or track timestamps in communicated packets. The timestamp counter may be synchronized, using control signals communicated via the MTSIF.

24 Claims, 9 Drawing Sheets

(51) Int. Cl.
*H04N 21/426* (2011.01)
*H04N 21/438* (2011.01)
*H04N 21/4385* (2011.01)
*H04N 21/8547* (2011.01)

(56) References Cited

U.S. PATENT DOCUMENTS

| | | | |
|---|---|---|---|
| 2002/0064189 A1 | 5/2002 | Coupe et al. | |
| 2003/0203718 A1* | 10/2003 | Wiswell | 455/13.3 |
| 2004/0049781 A1* | 3/2004 | Flesch et al. | 725/37 |
| 2006/0107195 A1* | 5/2006 | Ramaswamy et al. | 715/500.1 |
| 2006/0263095 A1* | 11/2006 | Bai | 398/183 |
| 2007/0047458 A1* | 3/2007 | Adkisson | 370/252 |
| 2007/0074256 A1* | 3/2007 | Jung et al. | 725/100 |
| 2008/0005586 A1* | 1/2008 | Munguia | 713/189 |
| 2009/0144766 A1* | 6/2009 | Jung et al. | 725/31 |
| 2011/0096234 A1 | 4/2011 | Mamidwar et al. | |

FOREIGN PATENT DOCUMENTS

| | | |
|---|---|---|
| EP | 1631072 | 3/2006 |
| EP | 2020800 | 2/2009 |
| JP | 2000236308 | 8/2000 |
| WO | 2007088482 | 8/2007 |

OTHER PUBLICATIONS

EPO Communication dated Apr. 4, 2011 in Application No. 10013994.8-1247.
Partial European Search Report for European Patent Application No. 14002558.6 mailed Dec. 18, 2014.

* cited by examiner

METHOD AND SYSTEM FOR MULTIPLEXED TRANSPORT INTERFACE BETWEEN DEMODULATORS (DEMODS) AND SET-TOP BOX (STB) SYSTEM-ON-CHIPS (SOCS)

CROSS-REFERENCE TO RELATED APPLICATIONS/INCORPORATION BY REFERENCE

This application is a continuation of U.S. patent application Ser. No. 12/909,350 entitled "METHOD AND SYSTEM FOR MULTIPLEXED TRANSPORT INTERFACE BETWEEN DEMODULATORS (DEMODS) AND SET-TOP BOX (STB) SYSTEM-ON-CHIPS (SOCS)" and filed on Oct. 21, 2010, which makes reference to, claims priority to and claims benefit from U.S. Provisional Patent Application Ser. No. 61/255,468 filed on Oct. 27, 2009.

The above stated applications are hereby incorporated herein by reference in their entirety.

FIELD OF THE INVENTION

Certain embodiments of the invention relate to video processing. More specifically, certain embodiments of the invention relate to a method and system for a multiplexed transport interface between demodulators (DEMODs) and set-top box (STB) system-on-chips (SoCs).

BACKGROUND OF THE INVENTION

Television broadcasts are generally transmitted by television head-ends over broadcast channels, via RF carriers. TV head-ends may comprise terrestrial TV head-ends, Cable-Television (CATV), satellite TV head-ends and/or internet television (IPTV) head-ends. Terrestrial TV head-ends may utilize, for example, a set of terrestrial broadcast channels, which in the U.S. may comprise, for example, channels 2 through 69. Cable-Television (CATV) broadcasts may utilize even greater number of broadcast channels. TV broadcasts comprise transmission of video and/or audio information, wherein the video and/or audio information may be encoded into the broadcast channels via one of plurality of available modulation schemes. TV Broadcasts may utilize analog and/or digital modulation format. In analog television systems, picture and sound information are encoded into, and transmitted via analog signals, wherein the video/audio information may be conveyed via broadcast signals, via amplitude and/or frequency modulation on the television signal, based on analog television encoding standard. Analog television broadcasters may, for example, encode their signals using NTSC, PAL and/or SECAM analog encoding and then modulate these signals onto a VHF or UHF RF carriers, for example.

In digital television (DTV) systems, television broadcasts may be communicated by terrestrial, cable and/or satellite head-ends via discrete (digital) signals, utilizing one of available digital modulation schemes, which may comprise, for example, QAM, VSB, QPSK and/or OFDM. Because the use of digital signals generally requires less bandwidth than analog signals to convey the same information, DTV systems may enable broadcasters to provide more digital channels within the same space otherwise available to analog television systems. In addition, use of digital television signals may enable broadcasters to provide high-definition television (HDTV) broadcasting and/or to provide other non-television related services via the digital system. Available digital television systems comprise, for example, ATSC, DVB, DMB-T/H and/or ISDN based systems. Video and/or audio information may be encoded into digital television signals utilizing various video and/or audio encoding and/or compression algorithms, which may comprise, for example, MPEG-1/2, MPEG-4 AVC, MP3, AC-3, AAC and/or HE-AAC.

Television sets (TVs) may be utilized to output audiovisual streams, which may comprise TV broadcasts, telecasts and/or localized Audio/Video (A/V) feeds from one or more available consumer audiovisual devices, such as videocassette recorders (VCRs) and/or Digital Video Disc (DVD) players. Audiovisual streams may be inputted directly into the TVs and/or via one or more specialized set-top boxes that may enable providing any necessary processing operations, via one or more of available types of connectors including, but not limited to, F-connectors, S-video, composite and/or video component connectors.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a multiplexed transport interface between demodulators (DEMODs) and set-top box (STB) system-on-chips (SoCs), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
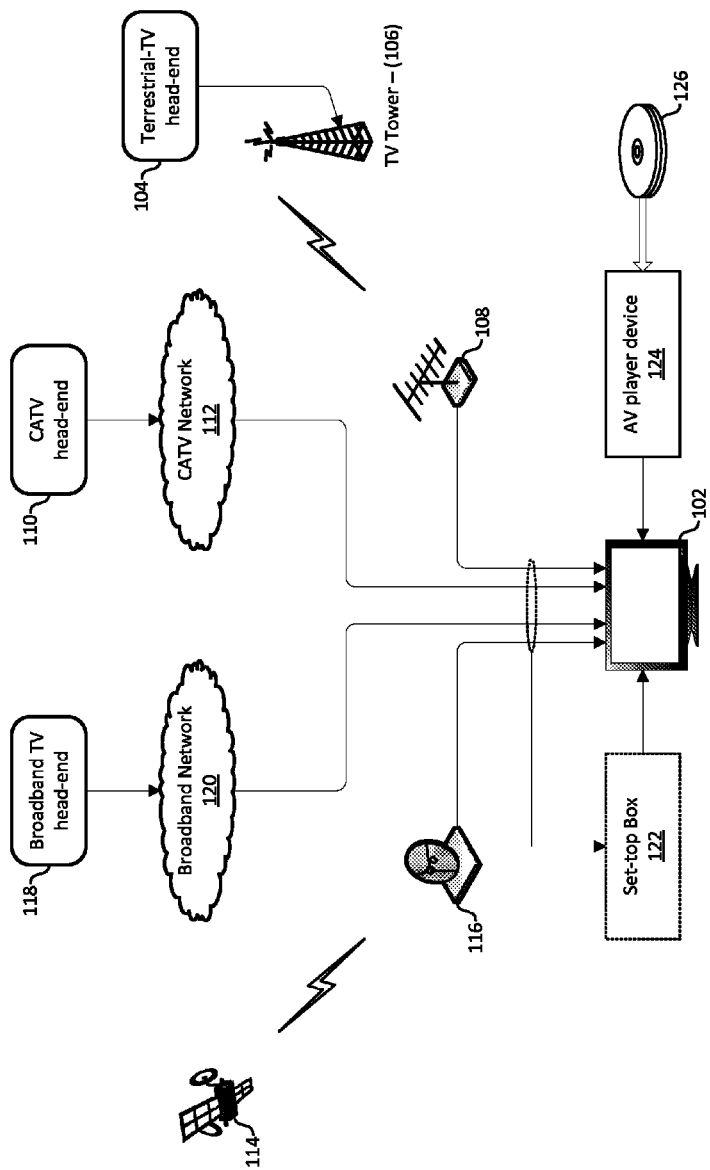
FIG. 1 is a block diagram illustrating an exemplary system that receives and/or presents TV broadcasts and/or local feeds, which may be utilized in accordance with an embodiment of the invention.

Certain embodiments of the invention may be found in a method and system for a multiplexed transport interface between demodulators (DEMODs) and set-top box (STB) system-on-chips (SoCs). In various embodiments of the invention, a multiplexed transport interface (MTSIF) may be utilized during communication between a demodulation module and a one or more other processing components, such as one or more video processing components in a video processing device for example. The demodulation module may comprise a plurality of demodulator chips, each of which may be utilized to demodulate a particular channel, to enable tuning to that channel. In this regard, the MTSIF may enable concurrent demodulation of a plurality of modulated inputs, such as input video data streams for example, via at least a portion of the plurality of demodulator chips within the demodulation module, by multiplexing communication of demodulated data corresponding to the demodulator chips via the MTSIF for example. The concurrent use of the plurality of demodulator chips may enable, for example, concurrent tuning to a plurality of broadcast channels at the same time. The at least one video processing component may comprise a video processing system-on-chip (SoC). Use of the MTSIF may enable standardizing the demodulation interfacing function in video processing components, regardless of the actual number of demodulator chips utilized. Standardizing the demodulation interfacing function may enable fixing the number of interconnect pins in the MTSIF, and/or reducing total number of chip pins between the demodulation module and the at least one video processing component regardless of the actual number of demodulator chips used.

The MTSIF may support communication of one or more control signals, which may be utilized to control and/or manage operations of the demodulation module, the at least one video processing component, and/or interactions with the MTSIF. Communication via the MTSIF between the demodulation module and the at least one video processing component may be synchronized. In this regard, the synchronization may be performed based timestamps that may be incorporated within packets that may be communicated via the MTSIF. Furthermore, the synchronization of communication via the MTSIF may comprise utilizing timestamp counters in the demodulation module and the at least one video processing component, respectively, to track and/or match the timestamps incorporated into the communicated packets. In this regard, the timestamp counters may be concurrently incremented and/or reset, using control signals communicated via the MTSIF for example. The MTSIF may support coupling additional demodulation modules. In this regard, at least a portion of data communicated by the additional demodulator modules may be multiplexed via the MTSIF. While the use of the MTSIF is described herein with respect to video processing, the invention need not be so limited. In this regard, various chips and/or components, including but not limited to video processing chips and/or components, may be configured to support the MTSIF and/or receive MTSIF based communications.

FIG. 1 is a block diagram illustrating an exemplary system that receives and/or presents TV broadcasts and/or local feeds, which may be utilized in accordance with an embodiment of the invention. Referring to FIG. 1, there is shown a media system 100, which may comprise a display device 102, a terrestrial-TV head-end 104, a TV tower 106, a TV antenna 108, a cable-TV (CATV) head-end 110, a cable-TV (CATV) distribution network 112, a satellite-TV head-end 114, a satellite-TV receiver 116, a broadband-TV head-end 118, a broadband network 120, a set-top box 122, and an audio-visual (AV) player device 124.

The display device 102 may comprise suitable logic, circuitry, interfaces and/or code for presenting multimedia streams, which may comprise audio-visual (AV) data. The display device 102 may comprise, for example, a television, a monitor, and/or other display and/or audio playback devices, and/or components that may be operable to playback video streams and/or corresponding audio data, which may be received, directly by the display device 102 and/or indirectly via intermediate devices, such as the set-top box 122, and/or may be inputted from local media recording/playing devices and/or storage resources, such as the AV player device 124.

The terrestrial-TV head-end 104 may comprise suitable logic, circuitry, interfaces and/or code that may enable over-the-air broadcast of TV signals, via one or more of TV towers 106. The terrestrial-TV head-end 104 may broadcast analog and/or digital TV signals. The TV antenna 108 may comprise suitable logic, circuitry, interfaces and/or code that may enable reception of TV signals transmitted by the terrestrial-TV head-end 104, via the TV towers 106. The CATV head-end 110 may comprise suitable logic, circuitry, interfaces and/or code that may enable communication of cable-TV signals. The CATV head-end 110 may broadcast analog and/or digital formatted cable-TV signals. The CATV distribution network 112 may comprise suitable distribution systems that may enable forwarding of communication from the CATV head-end 110 to a plurality of cable-TV consumers. For example, the CATV distribution network 112 may comprise a network of fiber optics and/or coaxial cables that enable connectivity between one or more instances of the CATV head-end 110 and the display device 102.

The satellite-TV head-end 114 may comprise suitable logic, circuitry, interfaces and/or code that may enable down link communication of satellite-TV signals to terrestrial recipients. The satellite-TV head-end 114 may comprise, for example, one of a plurality of orbiting satellite nodes in a satellite-TV system. The satellite-TV receiver 116 may comprise suitable logic, circuitry, interfaces and/or code that may enable reception of downlink satellite-TV signals transmitted by the satellite-TV head-end 114. For example, the satellite receiver 116 may comprise a dedicated parabolic antenna operable to receive satellite television signals communicated from satellite television head-ends. Furthermore, because most satellite-TV downlink feeds may be securely encoded and/or scrambled, the satellite-TV receiver 116 may also comprise suitable logic, circuitry, interfaces and/or code that may enable decoding, descrambling, and/or deciphering of received satellite-TV feeds. This function may also be performed in a different entity, such as the STB 122.

The broadband-TV head-end 118 may comprise suitable logic, circuitry, interfaces and/or code that may enable TV and/or multimedia broadcasts, via the broadband network 120 for example. The broadband network 120 may comprise a system of interconnected networks, which enables exchange of information and/or data among a plurality of nodes, based on one or more networking standards, including, for example, TCP/IP. The broadband network 120 may comprise a plurality of broadband capable sub-networks, which may include, for example, satellite networks, cable networks, DVB networks, the Internet, and/or similar local or wide area networks, that collectively enable conveying data that may comprise multimedia content to plurality of end users. Connectivity may be provided in the broadband network 120 based on copper-based and/or fiber-optic wired connections and/or wireless links, via standards-based interfaces. The broadband-TV head-end 118 and the broadband network 120 may correspond to, for example, an Internet Protocol Television (IPTV) system.

The set-top box 122 may comprise suitable logic, circuitry, interfaces and/or code when may enable processing TV and/or multimedia streams/signals received from one or more TV head-ends, to enable generation of video and/or audio data that may be played via the display device 102. In this regard, the set-top box 122 may perform at least some of the video/audio processing, and/or may also provide additional functions, such as encryption and/or access control related functions, such as digital right management (DRM) related processing.

The AV player device 124 may comprise suitable logic, circuitry, interfaces and/or code that enable providing video/audio feeds to the display device 102. The AV player device 124 may comprise, for example, a digital video disc (DVD) player, a Blu-ray player, a digital video recorder (DVR), a video game console, surveillance system, and/or personal computer (PC) capture/playback card. For example, the AV player device 124 may read and/or process multimedia data stored into multimedia storage devices 126, which may comprise DVD and/or Blu-ray discs, and may generate corresponding video and/or audio data that may be displayed via the display device 102. While the set-top box 122 and the AV player device 124 are shown are separate entities, at least some of the functions performed via the top box 122 and/or the AV player device 124 may be integrated directly into the display device 102.

In operation, the display device 102 may be utilized to play video streams, and/or additional associated information such as audio content, which may be received from one or more broadcast head-ends, and/or from one or more local sources, such as the AV player device 124. The display device 102 may, for example, receive TV broadcasts via the TV antenna 108 from the terrestrial-TV head end 104; cable-TV broadcasts, which may be communicated by CATV head-end 110 via the CATV distribution network 112; satellite TV broadcasts, which may be received via the satellite receiver 116; and/or Internet multimedia broadcasts, which may be communicated by the broadband-TV head-end 118 via the broadband network 120. Various formatting schemes may be utilized in conjunction with TV broadcasts. In this regard, these formatting schemes may comprise processing video and/or audio data corresponding to TV broadcasts, based on predefined standards and/or protocols, to facilitate communication from the TV head-ends to end-users, and reception and/or handling therein. Historically, TV broadcasts have utilized analog modulation based format schemes, comprising, for example, NTSC, PAL, and/or SECAM. Audio encoding may comprise utilization of separate modulation schemes, comprising, for example, BTSC, NICAM, mono FM, and/or AM. More recently, however, there has been a steady move towards Digital TV (DTV) based broadcasting. For example, the terrestrial-TV head-end 104 may be enabled to utilize ATSC and/or DVB based standards to facilitate DTV terrestrial broadcasts.

Communication of TV broadcast based on many of these formatting schemes may comprise performing modulation operations at the head-ends. Modulation is a process of transforming a low frequency (baseband) signal conveying certain information, such as video and/or audio data, into high frequency (passband) wireless or wired carrier signals. In this regard, modulation may ultimately enable modifying certain properties of the carrier signals based on the conveyed information. The modification performed during modulation may typically affect such parameters of the carrier signals as amplitude, phase, and/or frequency, all of which may be modified in accordance with low frequency signals corresponding to the conveyed information. Accordingly, each of the broadcasts from the various head-ends may comprise a plurality of sub-carrier signals corresponding to the various channels carried therein. For example, traditional (analog) terrestrial TV broadcasts typically comprises a set of terrestrial broadcast channels, which in the U.S. may comprise, for example, channels 2 through 69. Cable-Television (CATV) and/or satellite TV broadcasts may utilize even greater number of broadcast channels.

The display device 102 may be operable to directly process multimedia/TV broadcasts to enable playing of corresponding video and/or audio data. Alternatively, an external device, for example the set-top box 122, may be utilized to perform processing operations and/or functions, which may be operable to extract video and/or audio data from received media streams, and the extracted audio/video data may then be played back via the display device 102. The display device 102 may also be utilized to display video data inputted from the local sources, such as the AV player device 124. In this regard, the AV player device 124 may read and/or process multimedia data stored into multimedia storage devices, such as DVD or Blu-ray discs, and may generate corresponding video data that may be displayed via the display device 102. To view a particular channel, the display device 102, and/or the set-top box 122, may tune into the corresponding RF carrier, and may demodulate that particular carrier signal, via a demodulator chip or circuit for example, which may perform demodulation operations comprising, for example, passband-to-baseband conversions such that the low frequency (baseband) signal may be generated from the received carrier signal, to enable extracting information carried therein, which may comprise video and/or audio data. The extracted video and/or audio data may be processed thereafter to facilitate displaying corresponding images and/or playing corresponding audio, via the display device 102 for example.

In an exemplary aspect of the invention, it may be desirable to enable the display device 102, and/or setup box 122, to tune into different broadcast channels at the same time. In this regard, the multiple demodulator chips may be utilized concurrently, each of which utilized to tune into and/or perform necessary demodulation processing for a corresponding particular channel. For example, current use of multiple demodulator chips, via the set-top box 122 for example, may enable tuning into and/or watching a first program, via a main window in the display device 102, while at the same time tuning into and/or watching a second program via a Picture-In-Picture (PIP) window and/or recording a third program into the AV player 124 when utilized as a digital video recorder (DVR). The resulting demodulation related information, comprising extracted encoded video and/or audio data for example, may be transported to other components for further processing, which may comprise video processing system-on-chips (SoCs) for example, to enable generating corresponding output video/audio content which may be played back via the display device 102 for example. Typically, the transport is performed via per-chip transport interface that enable connecting the particular demodulator chip to these other components. Accordingly, utilizing multiple demodulator chips may necessitate utilizing and/or separating a plurality of separate and/or individual interfaces corresponding to the multiple demodulator chips utilized. This may be undesirable since it would require predetermining some anticipated maximum number of demodulator chips that may be used concurrently, and/or designing and/or manufacturing these other components interacting with the demodulator chips to support that particular predetermined number of demodulator chips. For example, in instances where each demodulator chip utilizes a 5-pin interface, components that may interact with 6 demodulator chips concurrently may have to incorporate 30 interconnect pins to allow attaching those 6 demodulator chips to them directly.

Accordingly, in various embodiments of the invention, a multiplexed transport interface (MTSIF) may be utilized instead to enable concurrent use and/or operation of the multiple demodulator chips. In this regard, the MTSIF may be utilized to support transport of data corresponding to variable number of demodulator chips over a fixed physical interface, comprising a predefined number of interconnect pins for example regardless of the actual number of demodulator chips used. In other words, the physical structure of the MTSIF, such as number and/or properties of interconnect pins incorporated therein for example, may be decoupled for the specific characteristics of the per-chip transport interfaces used in the demodulator chips. In this regard, demodulation related data corresponding to the multiple demodulator chips may be multiplexed within the MTSIF, instead, to enable communication of that data in parallel. Accordingly, these other components which typically need to interact with demodulator chips, such as video processing SoCs, may only need to support the MTSIF, and may need not be designed and/or manufactured to support only some predetermined specific number of demod chips. The multiplexed transport interface may support variable numbers of demod chips since the main limitation on the number of demod chips that may be utilized is the amount of data that may be multiplexed into that interface. Furthermore, because the multiplexed interface may remain unchanged regardless of the number of demod chips communicating through it, components receiving information via the multiplexed transport interface, such as video processing chips and/or devices, need not be designed and/or configured to support a specific number of demod chips. Another added advantage of utilizing the multiplexed transport interface is that it may enable reducing the total number of interconnect pins since the multiplexed transport interface may require less pins than the sum of pins of per-chip interfaces that may otherwise need to be supported. While the use of the MTSIF is described herein with respect to video processing, the invention need not be so limited. In this regard, various types of chips and/or components, including but not limited to video processing chips and/or components, may be configured to support the MTSIF and/or receive MTSIF based communications when performing other types of interactions and/or operations. For example, the MTSIF may be utilized to enable concurrent use and/or operation of multiple demodulator chips to support multiple concurrent broadband interactions. In this regard, the MTSIF may be supported by, and/or MTSIF handling may be configured and/or incorporated in, for example, one or more IP backend processing components to support concurrent communication with the multiple demodulator chips during concurrent broadband operations.

Figure 2A:
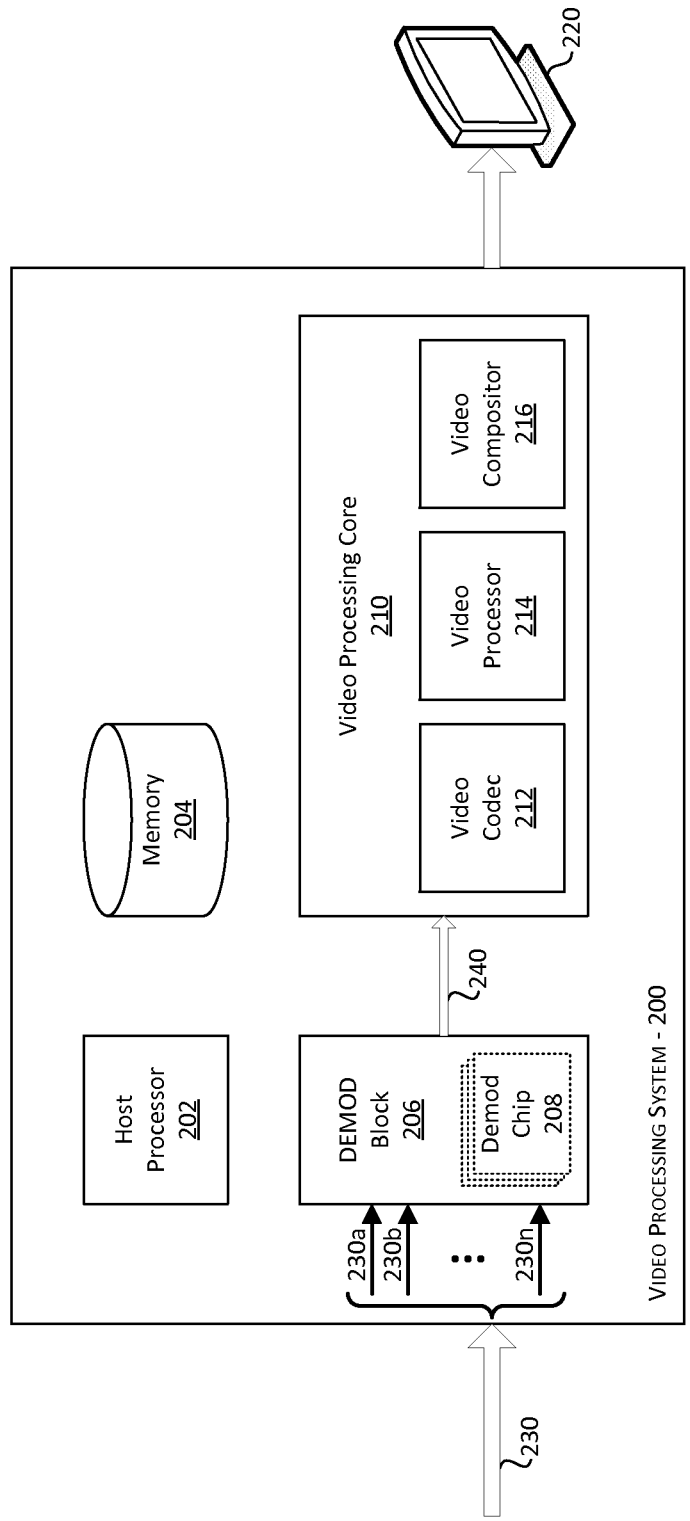
FIG. 2A is a block diagram illustrating an exemplary video processing system that may utilize a multiplexed demod-SoC interface, in accordance with an embodiment of the invention.

FIG. 2A is a block diagram illustrating an exemplary video processing system that may utilize a multiplexed demod-SoC interface, in accordance with an embodiment of the invention. Referring to FIG. 2A, there is shown a video processing system 200 and a display system 220.

The display system 220 may comprise suitable logic, circuitry and/or code that may enable performing display operations based on output video stream(s), generated via the video processing system 200. The display system 220 and the video processing system 200 may be integrated within a single device, such as the display device 102 of FIG. 1, for example. Alternatively, the display system 220 and the video processing system 200 may be integrated in different devices, which may be coupled together to enable playback operations. For example, the display system 220 may correspond to the display device 102 for example whilst the video processing system 200 may be integrated within a separate device, such as the set-top box 122, which may be utilized to perform dedicated video processing operations.

The input video stream 230 may comprise a data stream containing video information. The input video stream 230 may comprise, for example, an encoded video stream which may be generated and/or communicated, for example, via television head-ends and/or audio/video playback devices. For example, the input video stream 230 may comprise terrestrial-TV broadcast, CATV broadcast, satellite TV broadcast, or broadband-TV broadcast. In this regard, the input video stream 230 may comprise a plurality of sub-streams 230a-230n, which may correspond to a plurality of separate carrier signals within the input stream 230 that may bear and/or carry video data, and any related data such as audio and control information, corresponding to TV channels within the associated TV broadcast.

The video processing system 200 may comprise suitable logic, circuitry, interfaces and/or code that may enable processing of input video streams, and/or generation of video playback streams that may be played via a corresponding display and/or playback component, such as the display system 220. In this regard, the video processing system 200 may comprise a host processor 202, a system memory 204, a demodulation (DEMOD) block 206, and a video processing core 210.

The host processor 202 may comprise suitable logic, circuitry, interfaces and/or code that may be operable to process data, and/or control and/or manage operations of the video processing system 200, and/or tasks and/or applications performed therein. In this regard, the host processor 202 may be operable to configure and/or control operations of various components and/or subsystems of the video processing system 200, by utilizing, for example, one or more control signals. The host processor 202 may also control data transfers within the video processing system 200. The host processor 202 may enable execution of applications, programs and/or code, which may be stored in the system memory 204, for example.

The system memory 204 may comprise suitable logic, circuitry, interfaces and/or code that may enable permanent and/or non-permanent storage, buffering, and/or fetching of data, code and/or other information which may be used, consumed, and/or processed in the video processing system 200. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware, but the configuration data need not be limited in this regard.

The video processing core 210 may comprise suitable logic, circuitry, interfaces and/or code that may be operable to perform video processing operations. The video processing core 210 may be operable to process the input video stream 230, received via the video processing system 200, to enable generation of output video stream(s) for display via the display system 220. In this regard, the video processing core 210 may comprise, for example, a video encoder/decoder (codec) 210, a video processor 214, and a video compositor 216, which may comprise a video scaler 216. In an exemplary aspect of the invention, the video processing core 210, or portions thereof, may be implemented as one or more system-on-chips (SoCs).

The video codec 212 may comprise suitable logic, circuitry, interfaces and/or code for performing video encoding and/or decoding. For example, the video codec 212 may be operable to process received encoded and/or compressed video data, performing, for example, video decompression and/or decoding operations. The video codec 212 may also be operable to decode and/or format video data which may be generated via the video processing core 210, as part of output video stream(s). In this regard, the video codec may be operable to decode and/or encode video data formatted based on based on one or more compression standards, such as, for example, H.262/MPEG-2 Part 2, H.263, MPEG-4 Part 2, H.264/MPEG-4 AVC, AVS, VC1, and/or VP6/7/8. Furthermore, in instances where received compressed/encoded video data is communicated via transport streams, which may be received as TV broadcasts and/or local AV feeds, the video codec 212 may be operable to demultiplex and/or parse the received transport streams to extract video data within the received transport streams. The video codec 212 may also perform additional operations, including, for example, security operations such as digital rights management (DRM).

The video processor 214 may comprise suitable logic, circuitry, interfaces and/or code that may be operable to perform video processing operations on received video data, after it has been decoded and/or decompressed, to facilitate generation of corresponding output video data, which may be played via, for example, the display system 220. In this regard, the video processor 214 may be operable to perform such operations as de-noising, de-blocking, restoration, deinterlacing and/or video sampling.

The video compositor 216 may comprise suitable logic, circuitry, interfaces and/or code that may be operable generate output video data suitable for display via one or more display devices based on input video data processed via the video processing core 210. For example, the video compositor 216 may perform various operations to ensure that generated output video stream(s) may be suited for playback via the display system 220. The video compositor 216 may be operable to perform, for example, motion estimation and/or compensation, frame up/down-conversion, cropping, and/or scaling.

The DEMOD block 206 may comprise suitable logic, circuitry, interfaces and/or code that may be operable to perform demodulation and/or tuning operations, which may enable extracting video information, and/or other related information such as audio data, corresponding to, for example, particular carrier frequency, which may correspond to a particular channel. In an exemplary aspect of the invention, the DEMOD block 206 may comprise a plurality of demodulator chips 208, each of which may be utilized to tune in and/or demodulate a particular channel. Accordingly, multiple broadcast channels may be received and/or processed by tuning, to each in parallel, using the plurality of demodulator chips 208.

In operation, the video processing system 200 may be operable to perform video display and/or playback operations, to facilitate, for example, displaying of images corresponding to video data received via the input video stream 230. The video processing system 200 may be operable to perform video processing operations, via the video processing core 210, which may enable, for example, generation of output video stream(s) which may be displayable via the display system 220. The DEMOD block 206 may be utilized to tune into and/or demodulate carrier signals, corresponding to a particular broadcast channel, to extract data carried thereby. In this regard, the extracted data may comprise encoded and/or compressed video data and/or associated additional data, such as audio for example. The extracted data may then be transferred to the video processing core 210, via an interface 240 for example, where it may be decoded and/or processed in the video processing core 210. The corresponding output video content may be configured for playback via the display system 220, using the video compositor 216.

In an exemplary aspect of the invention, the video processing system 200 may be utilized to support concurrent reception of multiple inputs, such as, for example, the plurality of sub-streams 230a-230n of the input video stream 230, or a portion thereof. In this regard, the DEMOD block 206 may be operable to concurrently tune into at least a portion of the plurality of sub-streams 230a-230n, and/or perform demodulation operations related thereto using multiple demodulator chips 208, to enable extraction of data carried therein in parallel. The extracted data may then be transferred to the video processing core 210, via the interface 240 for example, where it may be decoded and/or processed, in parallel and/or sequentially, via the video processing core 210. Corresponding output video content may be configured for playback via a particular display device, such as the display system 220, using the video compositor 216. In one exemplary embodiment, at least some of the multiple video streams may then be combined via the video compositor 216 for concurrent playback via the display system 220.

In various embodiments of the invention, the interface 240 between the DEMOD 206 and the video processing core 210 may be configured, using the host processor 202 for example, as a multiplexed transport interface (MTSIF), which may be utilized to enable concurrent use and/or operation of multiple demodulator chips 208 in the DEMOD block 206 at the same time without necessitating that the video processing core 210 be configured and/or designed to support individual per-chip transport interfaces. In this regard, data extracted by the multiple demodulator chips 208 may be multiplexed into the interface 240, which may be configured, by the host processor 202 for example, as a MTSIF, to obviate the need for supporting separate individual interfaces between each of the multiple demodulator chips 208 and the video processing core 210, or components therein.

Figure 2B:
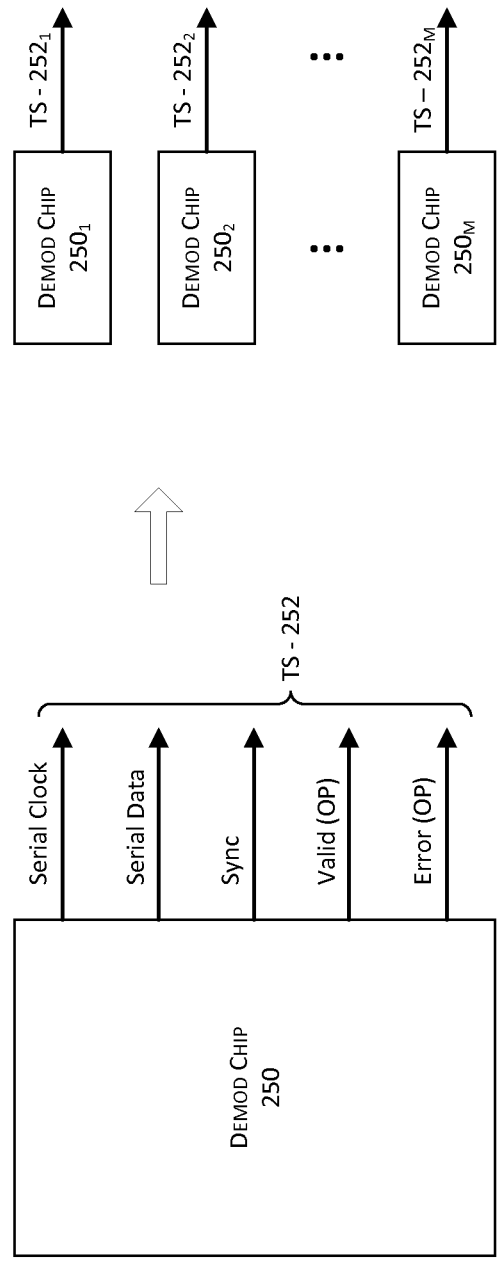
FIG. 2B is a block diagram illustrating an exemplary demodulator chip, which may be utilized in accordance with an embodiment of the invention.

FIG. 2B is a block diagram illustrating an exemplary demodulator chip, a plurality of which may be utilized in accordance with an embodiment of the invention. Referring to FIG. 2B, there is shown a demodulator chip 250, and a plurality of demodulator chips $250_1$-$250_M$, which may correspond to the demodulator chips 208 of FIG. 2A for example.

The demodulator chip 250 may comprise suitable logic, circuitry, interfaces and/or code that may be operable to perform demodulation on a particular carrier signal that had been modulated, in accordance with one or more TV broadcasting formatting schemes for example, to enable extracting data carried therein. In this regard, the demodulator chip 250 may be utilized to tune into a particular channel in terrestrial-TV, CATV, satellite-TV, and/or broadband broadcast(s). The demodulator chip 250 may be configure to enable changing the carrier signal demodulated therein, and correspondingly to tune in to different channels, based on user input and/or selection for example. Each of the demodulator chips $250_1$-$250_M$ may be similar to the demodulator chip 250.

The demodulator chip 250 may utilize a transport interface 252 during interactions with other components, such as in interaction with video processing components to enable communicating extracted video data and/or associated data. In this regard, the transport interface 252 may comprise a plurality of signals, which may be communicated over a plurality of physical interconnect contact pins that are utilized to couple the demodulator chip 250 to a corresponding component, which may comprise a video processing system-on-chip (SoC). The transport interface 252 may comprise, for example, a serial clock signal, a serial data signal, a synchronization (sync) signal, a valid signal, and an error signal communicate over a predefined number of interconnect contact pins. In this regard, each of these signals may be communicated over one or more associated pins.

The serial clock signal may be utilized to clock operations related to communication via the transport interface 252. In this regard, the serial clock signal may be generated by the demodulator chip 250, and may then be communicated to the receiving peer, such as a video processing component. The serial clock signal may be implemented as a 1-pin signal. In this regard, a single interconnect contact pin may be assigned in the transport interface 252 for communicating the serial clock signal. The serial data signal may be utilized to communicate data extracted and/or generated based on demodulation operations performed in the demodulator chip 250. The serial data signal may be implemented as a 1-pin signal. In this regard, a single interconnect contact pin may be assigned in the transport interface 252 for communicating the serial data signal. The sync signal may be utilized to synchronize operations related to communication via the transport interface 252. In this regard, the sync signal may be generated by the demodulator chip 250. The sync signal may be implemented as a 1-pin signal. In this regard, a single interconnect contact pin may be assigned in the transport interface 252 for communicating the sync signal. The valid signal may be an optional signal, which may be generated by the demodulator chip 250, and communicated thereafter, to indicate that the serial data signal carries valid data. The valid signal may be implemented as a 1-pin signal. In this regard, a single interconnect contact pin may be assigned in the transport interface 252 for communicating the valid signal. The error signal may be an optional signal, which may be generated by the demodulator chip 250, and communicated thereafter, to indicate that an error had occurred during demodulation operations performed in the demodulator chip 250. The error signal may be implemented as a 1-pin signal. In this regard, a single interconnect contact pin may be assigned in the transport interface 252 for communicating the error signal. Accordingly, the transport interface 252 may be implemented as a 5-pin interface.

Video processing systems, such as the video processing system 200 of FIG. 2A, may be configured to support concurrent demodulation operations, to enable concurrent tuning to different TV broadcast channels at the same time for example. This may be achieved by incorporating and/or concurrently utilizing multiple demodulator chips, such as the plurality of demodulator chips $250_1$-$250_M$. In this regard, the multiple demodulator chips $250_1$-$250_M$ may be utilized to enable concurrent demodulation of a plurality of received channels, such as within one or more TV broadcasts. In order to support concurrent operations of the multiple demodulator chips $250_1$-$250_M$, subsequent entities handling data extracted by the multiple demodulator chips $250_1$-$250_M$, such as the video processing core 210 or components thereof, are operable to concurrently handle the transport interfaces $252_1$-$252_M$ associated with the multiple demodulator chips $250_1$-$250_M$, respectively. In this regard, each of the transport interfaces $252_1$-$252_M$ may be similar to the transport interface 252 as described above. This may necessitate pre-designing and/or manufacturing the video processing core 210, or at least some components therein, to support concurrent interactions with a plurality of demodulator chips, which may be set to a pre-determined value corresponding to the maximum anticipated number of concurrent demodulation operations to be supported thereby. For example, in instances where the video processing core 210 may be configured to support a maximum of 6 modulator chips 250, the video processing core 210, or components therein, must be designed and/or configured to support 30 pins corresponding to the 6 instances of the transport interface 252. Such approach, however, may not be desirable.

Accordingly, in various embodiments of the invention, multiplexed transport interface (MTSIF) may be utilized instead. In this regard, rather than connecting the demodulator chips $250_1$-$250_M$ to corresponding components in the video processing core 210 directly via the transport interfaces $252_1$-$252_M$, a multiplexed interface may be utilized to multiplex data communicated by the demodulator chips $250_1$-$250_M$. This obviate the need to redesign and/or manufacture those component based on predetermined number of chips. Accordingly, the actual number of the demodulator chips $250_1$-$250_M$ may be varied without requiring hardware changes at the video processing core 210, as long as the multiplexed transport interface allows for communication of data communicated by the demodulator chips $250_1$-$250_M$ in parallel.

Figure 3A:
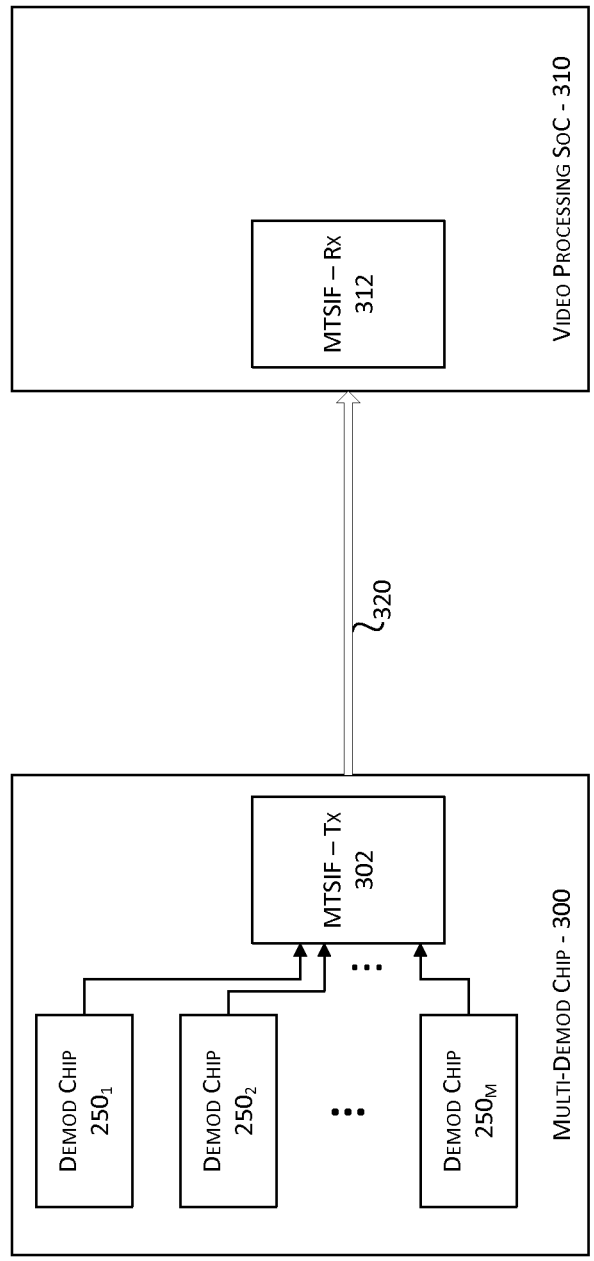
FIG. 3A is a block diagram illustrating an exemplary multi-chip demodulation module that may interact with video processing system-on-chip (SoC) via a multiplexed interface, accordance with an embodiment of the invention.

FIG. 3A is a block diagram illustrating an exemplary multi-chip demodulation module that may interact with video processing system-on-chip (SoC) via a multiplexed interface, in accordance with an embodiment of the invention. Referring to FIG. 3A, there is shown a multi-demodulator (demod) chip block 300 and a video processing system-on-chip 310.

The multi-demod chip block 300 may comprise suitable logic, circuitry, interfaces and/or code that may be operable to incorporation and/or support concurrent use of multiple demodulator chips, such as the plurality of demodulator chips $250_1$-$250_M$. In this regard, the multi-demod chip block 300 may correspond to, for example, the DEMOD block 206 of FIG. 2A. In an exemplary aspect of the invention, the multi-demod chip block 300 may support use of multiplexed transport of demodulation related data and/or signals, via a multiplexed transport interface (MTSIF) 320 for example, substantially as described with regard to FIGS. 2A and 2B. The MTSIF 320 may comprise, for example, a plurality of interconnect pins that may be utilized in communication demodulation related data and/or signals. In this regard, at least some of the data and/or the signals communicated via the MTSIF 320 may be generated by multiplexing associated data and/or signals communicated by each of the plurality of demodulator chips $250_1$-$250_M$. The multi-demod chip block 300 may comprise, for example, a multiplexed transport interface (MTSIF) transmitter 302, which may be operable to support communicating with the video processing SoC 310 via the MTSIF 320.

The video processing SoC 310 may comprise suitable logic, circuitry, interfaces and/or code that may be operable to process video data, and/or associated data, that may be extracted via the multi-demod chip block 300. In this regard, the video processing SoC 310 may correspond to the video processing core 210, or portions and/or components thereof. In an exemplary aspect of the invention, the video processing SoC 310 may be configured to support use of multiplexed transport of demodulation related data and/or signals. In this regard, the video processing SoC 310 may comprise a multiplexed transport interface (MTSIF) receiver 312, which may be operable to support communicating demodulation related data and/or signals, corresponding to the plurality of demodulator chips $250_1$-$250_M$ for example, to and/or from the multi-demod chip block 300 via the MTSIF 320.

In operation, the multi-demod chip block 300 may support concurrent demodulation operations, which may enable tuning into different TV broadcast channels at the same time. In this regard, the multi-demod chip block 300 may enable incorporating and/or concurrently utilizing the demodulator chips $250_1$-$250_M$, each of which may be configured independently to tune into a particular TV channel for example. To support concurrent operations of the multiple demodulator chips $250_1$-$250_M$, the MTSIF 320 may be utilized to communicate demodulation related information and/or data extracted based on demodulation operations performed the multiple demodulator chips $250_1$-$250_M$ between the multi-demod chip block 300 and the video processing SoC 310. In this regard, the MTSIF transmitter 302 may be enable multiplexing data and/or information communicated by the demodulator chips $250_1$-$250_M$ into corresponding elements and/or signals within the MTSIF 320. The MTSIF receiver 312, on the video processing SoC 300 side, may enable demultiplexing data and/or signals received via the MTSIF 320, such that data extracted by each of the demodulator chips $250_1$-$250_M$ may be separated. Video processing operations may be performed thereafter on each of the extracted data in the demodulator chips $250_1$-$250_M$ separately such that output video contents corresponding to each of the tuned into channel may be generated.

Accordingly, use of the MTSIF 320 may obviate the need to design, manufacture, and/or configure the video processing SoC 310 to support a specific and/or fixed number of instances of the per-chip transport interface 252. Instead, the video processing SoC 310 would only need to support the MTSIF 320, regardless of the actual number of the demodulator chips $250_1$-$250_M$ that effectively attached via the MTSIF 320. Consequently, the video processing SoC 310 may be designed and/or manufactured without the need to support a fixed number of the transport interface 252, which may be based on pre-determined anticipated maximum number of chips that may be connected to the video processing SoC 310 directly.

Multiplexing data corresponding to the demodulator chips $250_1$-$250_M$ may be performed by configuring the MTSIF 320 to communicate larger amount of data and/or doing so faster compared to the per-chip transport interface 252. For example, communication via the MTSIF 320 may be clocked at frequency greater than the clock frequencies of demodulator chips $250_1$-$250_M$. Furthermore, the data pipeline incorporated into the MTSIF 320 may allow communication of larger packets than those communicated via the per-chip transport interface 252. Accordingly, the MTSIF transmitter 302 may buffer demodulation data received from each of the demodulator chips $250_1$-$250_M$. Once sufficient data corresponding to a demodulator chip has been buffered, which may comprise data corresponding to multiple packets sent by that particular demodulator via its dedicated per-chip transport interface 252, the MTSIF transmitter 302 may construct a packet that may be communicated via the MTSIF 320. Upon reception, the MTSIF receiver 312 may buffer the data in the received packet, and may then forward the data within the video processing SoC 310. In this regard, the MTSIF receiver 312 may forward that data as a whole. Alternatively, the MTSIF receiver 312 may forward that data in portions, to simulate demodulation data communication via per-chip transport interface 252 for example.

In one exemplary embodiment of the invention, timestamps may be utilized to guard against and/or mitigate jitter errors. In this regard, jitter errors may result from delays caused by buffering operations performed during MTSIF communication, which may cause data to be processed on the SoC-side out of order. In this regard, timestamps may be incorporated into packets communicated via the MTSIF 320. Furthermore, associated timestamp counters may utilized on both sides of the MTSIF 320, within the multi-demod chip block 300 and the video processing SoC 310, to ensure that packets communicated via the MTSIF 320 are consumed on the SoC-side in the same order in which they were communicated from the demod-side. In this regard, the demod-side timestamp counter may be utilized to set the timestamp in the packets, whereas the SoC-side timestamp counter is utilized to generate values that are compared against timestamps in received packets, to determine correct order of communication. The SoC-side and demod-side timestamp counter may be synchronized. In this regard, the SoC-side and demod-side timestamp counters may be synchronized by resetting and/or incrementing both of them at the same time. In an exemplary embodiment of the invention, the reset and/or increment signals may be generated on one side, and communicated to the other side, via the MTSIF 320, for example.

Figure 3B:
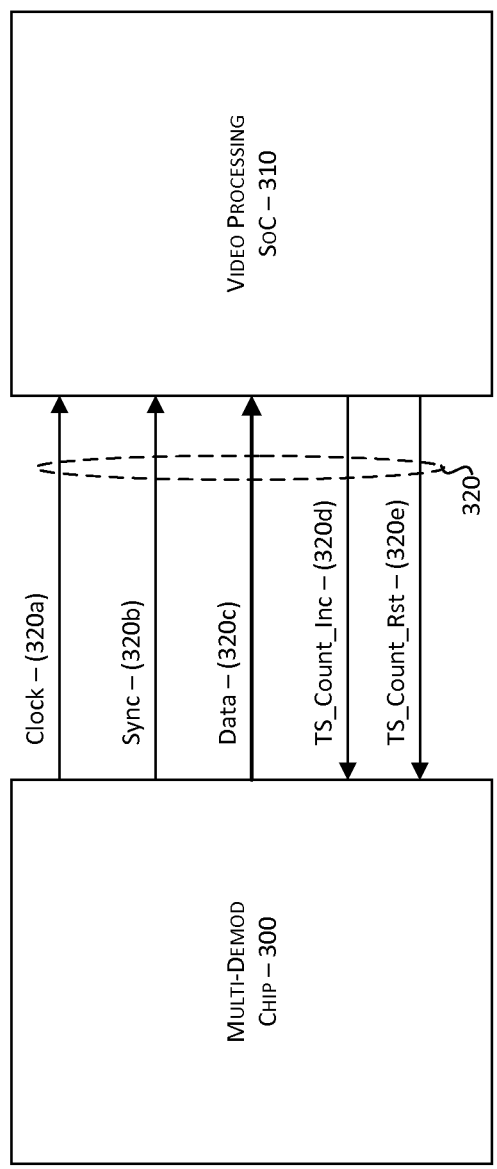
FIG. 3B is a block diagram illustrating an exemplary structure of multiplexed transport interface (MTSIF) which may be utilized between multi-chip demodulation module and a video processing system-on-chip (SoC), in accordance with an embodiment of the invention.

FIG. 3B is a block diagram illustrating an exemplary structure of a multiplexed transport interface (MTSIF) which may be utilized between multi-chip demodulation module and a video processing system-on-chip (SoC), in accordance with an embodiment of the invention. Referring to FIG. 3B, there is shown the multi-demod chip block 300, the video processing SoC 310, and the MTSIF 320, substantially as described with regard to FIG. 3A.

The MTSIF 320 may comprise, for example, a clock signal 320a, a synchronization (sync) signal 320b, a data signal 320c, a timeslot count increment (TS_count_inc) signal 320d, and a timeslot count reset (TS_count_rst) signal 320e.

The clock signal 320a may be utilized to clock operations related to communication via the MTSIF 320. In this regard, the clock signal 320a may be generated on the DEMOD-side, and then sent to the SoC-side. The clock signal 320a may be continuous, requiring no gaps since packets communicated over the MTSIF 320 are generally continuous. The frequency of the clock signal 320a may be configured such that its value may be greater than the sum of all of serial clock signals of the demodulator chips $250_1$-$250_M$. The clock signal 320a may be implemented as a 1-pin signal. The sync signal 320b may be utilized to synchronize operations related to communication via the MTSIF 320. The sync signal 320b may be implemented as a 1-pin signal.

The data signal 320c may be utilized to communicate via the MTSIF 320 data extracted and/or generated based on demodulation operations performed by the plurality of demod chips associated with the multi-demod chip block 300. In this regard, the data may be communicated over the MTSIF 320, by the MTSIF transmitter side, as packets, each of which comprising a uniquely configured MTSIF-specific header, to enable the receiver side to determine how to utilize and/or direct the data carried therein for further processing. In this regard, the headers may be utilized, for example, to identify the particular demodulator chips associated with the data carried in the corresponding packets. This may enable forwarding the data to corresponding video processing path associated with a specific channel, for which the particular demodulator chip may be utilized for tuning and/or demodulation processing. The data signal 320c may be configured as multi-pin signals. In this regard, a plurality of interconnect contact pins may be assigned in the MTSIF for communicating the data signal 320c signal. The number of pins used may be determined based on, for example, the amount of data communicated via the data signal 320c signal. In this regard, the data signal 320c may have different width, such as 2, 4, 8, or 16 bits wide, depending on the amount of data that may need to be multiplexed into the MTSIF 320. Determining the width of the data signal 320c may be design-time and/or manufacture-time consideration. For example, in instances where 8-bit width is utilized for data communications, the data signal 320c may be implemented as an 8-pin signal.

The TS_count_inc signal 320d may be utilized to increment timestamp counters which may be utilized on the DEMOD and/or the SoC-side in conjunction with multiplexing data into the MTSIF 320. In an exemplary embodiment of the invention, the TS_count_inc signal 320d may be generated by the SoC-side, and communicated to the DEMOD-side. The TS_count_inc signal 320d may be implemented as a 1-pin signal. The TS_count_rst signal 320e may be utilized to reset timestamp counters utilized on the SoC-side and the DEMOD-side. In this regard, resetting the timestamp counters, based on the TS_count_rst signal 320e, may enable (re)synchronizing these counters on both sides. The TS_count_rst signal 320e may be implemented as a 1-pin signal.

Accordingly, in instances where 8-bit width is utilized for data communications, the MTSIF 320 may be implemented as a 12-pin interface, regardless of the actual number of demod chips incorporated into the multi-chip block 300. This may enable reducing the number of pins necessary for supporting concurrent operations of multiple demodulator chips. For example, in instances where it may be desired to support concurrent operations of 6 demodulator chips 250, use of the MTSIF 320 as described herein, as a 12-pin interface for example, may enable reducing the total number of pins by 18 compared to having to support individual transport interfaces for each of the 6 demodulator chips 250, each of which may comprise 6-pins as described in FIG. 2B. The use of the MTSIF 320 may also simplify design and/or use of the video processing SoCs since they may be configured to handle the same interface, the MTSIF 320, regardless of the actual number of demodulator chips 250 used and/or configured. In other words, the video processing SoCs need not be designed and/or manufactured variably after a determination of a fixed number of demodulator chips used in conjunction therewith, and be limited by that determination thereafter.

Figure 3C:
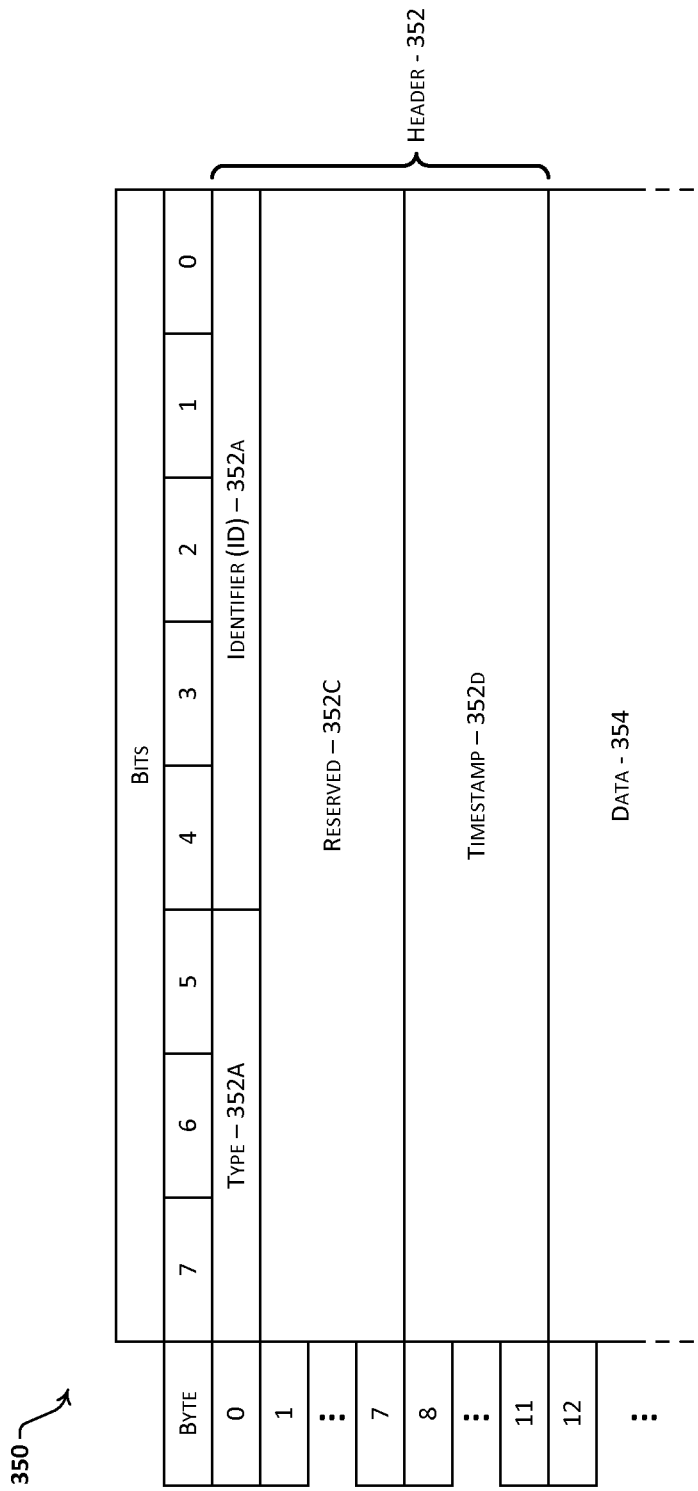
FIG. 3C is a block diagram illustrating an exemplary structure of a packet that may be utilized to transport data via a multiplexed transport interface (MTSIF), in accordance with an embodiment of the invention.

FIG. 3C is a block diagram illustrating an exemplary structure of a packet that may be utilized to transport data via multiplexed transport interface (MTSIF), in accordance with an embodiment of the invention. Referring to FIG. 3C, there is shown a packet 350, which may be utilized in generating data packets that are utilized to communicate data via the MTSIF 320.

The packet structure 350 may comprise a header or header portion 352 and data portion 354. The header 352 may comprise, for example, 12 bytes, which may be utilized to specify and/or convey information that may enable handling the packet 350 at the receiving side. In this regard, the header 352 may comprise a type field 352a, an identifier field 352b, a reserved field 352c, and a timestamp field 352d. The type field 352a may comprise information that may be utilized to identify type of data carried in the packet 350. For example, the field 352a may identify the carried data as being MPEG2 transport stream (TS) encoded data. The type field 352b may be a 3-bit field, for example, comprising bits 7 . . . 5 in byte 0.

The identifier field 352b may be utilized to identify the particular demodulator chip associated with the data contained in the packet 350. The identifier field 352b may be a 5-bit field, for example, comprising bits 4 . . . 0 in byte 0. The reserved field 352c may remain unused, and/or may be utilized to store additional information if needed. The reserve field 352c may be a 7-byte field, for example, comprising bytes 1-7. The timestamp field 352d may be utilized to store a timestamp value associated with the packet 350. In this regard, the timestamp field 352d may be set using a timestamp counter at the demod-side, to enable comparing it against present values provided by a timestamp counter at the SoC-side. The timestamp field 352d may be a 4-byte field, for example, comprising bytes 8-11. The data portion 354 may comprise a variable number of bytes, starting at byte 12. In this regard, the length of the data portion 354 may determined based on the maximum size of the packet 350, as dictated by the width of the data signal 320c, and/or by the type of data carried therein. For example, in instances where the data signal 320c is implemented as an 8-bit pipe, and that data carried corresponds to MPEG2 TS encoded data, the size of the data portion 352 may be 188 bytes.

Figure 4A:
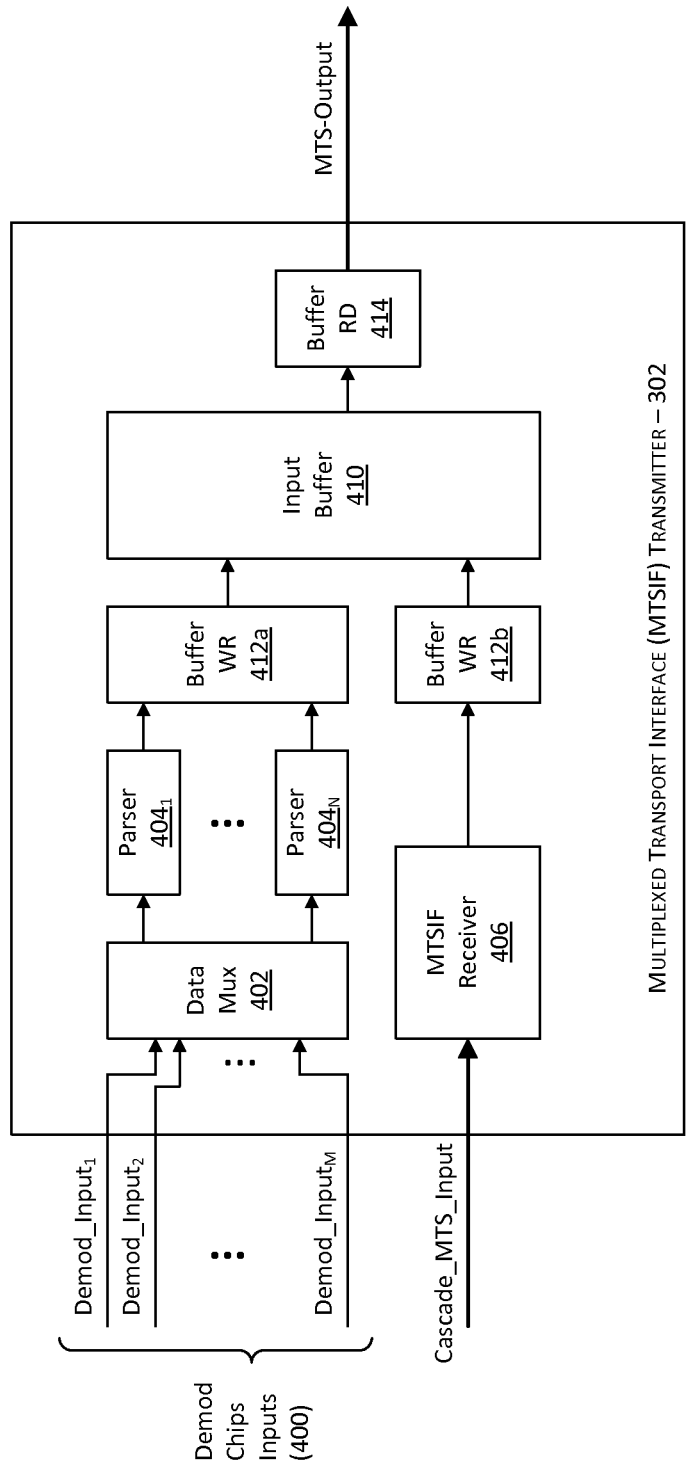
FIG. 4A is a block diagram illustrating an exemplary structure of multiplexed transport interface (MTSIF) transmitting block, in accordance with an embodiment of the invention.

FIG. 4A is a block diagram illustrating an exemplary structure of multiplexed transport interface (MTSIF) transmitting block, in accordance with an embodiment of the invention. Referring to FIG. 4A, there is shown the multiplexed transport interface (MTSIF) transmitter 302 of FIG. 3A.

The MTSIF transmitter 302 may comprise, for example, a data multiplexer (MUX) 402, a plurality of parsers $404_1$-$404_N$, a cascading MTSIF receiver 406, a data buffer 410, buffer write ports 412a and 412b, and a buffer read port 414.

The multiplexer (MUX) 402 may comprise suitable logic, circuitry, interfaces and/or code that may be operable to select one or more outputs from a plurality of inputs, based on one or more control signals. In this regard, the MUX 402 may be utilized to direct data from one of the demod_input$_1$-demod_input$_M$, corresponding to demodulator chips $250_1$-$250_M$, to corresponding one of the parsers $404_1$-$404_N$.

Each of the parsers $404_1$-$404_N$ may comprise suitable logic, circuitry, interfaces and/or code that may be operable to parse though data inputted from the MUX 402. In this regard, the parsers $404_1$-$404_N$ may be utilized to extract only the information that may be communicated via the MTSIF 320. For example, the parsers $404_1$-$404_N$ may essentially extract only demodulation related data, and may remove any additional data which may have been added to facilitate use of the transport interface 252 when the demodulator chips 250 would be used individually rather than in multi-chip configuration.

The cascading MTSIF receiver 406 may comprise suitable logic, circuitry, interfaces and/or code that may be operable to receive MTSIF based stream outputted by another instance of the multi-demod chip block 300. This may be enable cascading multiple instances of the multi-demod chip block 300, such as in daisy-chain configuration, to enable combining more demodulation data when there is available bandwidth to do so.

The data buffer 410 may comprise suitable logic, circuitry, interfaces and/or code that may be operable to buffer demodulation related data until packets may be generated for transfer via the MTSIF 320. In this regard, because packets communicated via the MTSIF may carry a larger amount of data, data corresponding to a particular demodulator chip 250 may be buffered for multiple cycles in the demodulator chip before being pushed through the MTSIF 320 to the SoC-side.

Each of the buffer write ports 412a and 412b may comprise suitable logic, circuitry, interfaces and/or code that may be operable to write data into the buffer 410. In this regard, each demodulator chip 250, or additional instances of the multi-demod chip block 300 in cascading configurations, may be assigned dedicated portion within the buffer 410, in which data corresponding to that chip may be buffered. Therefore, the buffer write ports 412a and 412b may be used to route input data, into the appropriate storage locations in the buffer 410. The buffer write port 412a may be utilized in conjunction with the parsers $404_1$-$404_N$, to buffer data corresponding to internal demodulator chips. The buffer write port 412b may be utilized in conjunction with the cascading MTSIF receiver 406, to facilitate buffering of input data received from other instances of the multi-demod chip block 300 supported in cascading-based configurations.

The buffer read port 414 may comprise suitable logic, circuitry, interfaces and/or code that may be operable to read out buffered input data from the buffer 410 to communicate corresponding instances of packet 350 via the MTSIF 320.

In operation, the MTSIF transmitter 302 may be enable multiplexing communication of demodulation information corresponding to a plurality of demodulator chips, such as the demodulator chips $250_1$-$250_M$. In this regard, multiplexed transport of demodulation related data may be enabled by configuring the MTSIF 320 to communicate larger amount of data and/or doing so faster compared to the per-chip transport interface 252. For example, communication via the MTSIF 320 may be clocked at frequency greater than the clock frequencies of demodulator chips $250_1$-$250_M$, and/or by incorporating the data signal 320c in the MTSIF 320, which may allow communication of larger packets than those communicated via per-chip transport interface 252. Accordingly, the MTSIF transmitter 302 may buffer demodulation data received from each of the demodulator chips $250_1$-$250_M$, and construct packets 350 only when sufficient data corresponding to a particular demodulator chip has been buffered.

In an exemplary embodiment of the invention, the MUX 402 may select one or more outputs from the demod_input$_1$-demod_input$_M$, corresponding to demodulator chips $250_1$-$250_M$, and may direct the selected outputs to corresponding one or more of the parsers $404_1$-$404_N$. The parsers $404_1$-$404_N$ may be utilized to extract only the information that may be communicated via the MTSIF 320, removing any additional data, such as headers or footers, which may have been added to facilitate use of other transport interfaces, such as the transport interface 252 for example. In some instance, no changes may be needed, and the data may pass through the parsers $404_1$-$404_N$ unchanged. The outputs of the parsers $404_1$-$404_N$ may be forwarded to the buffer write port 412a, which write that data into the appropriate locations within the buffer 410. In this regard, data corresponding to each of the demodulator chips $250_1$-$250_M$ may be stored separately. The MTSIF transmitter 302 may continually track amount of buffered data corresponding to each of the demodulator chips $250_1$-$250_M$, and may trigger generation of corresponding packet 350 carrying data for each particular chip when sufficient data is buffered in the buffer 410. The generation of packets 350 may also be triggered cyclically. In this regard, the MTSIF transmitter 302 may be clocked at frequency that is larger than the clock frequency of each of the utilized demodulator chips. Therefore, the MTSIF may construct packets 350 in, for example, a round-robin manner, rotating through all of the utilized demodulator chips. The packets 350 may be generated via the buffer read port 414, which may read data that may be carried in the packet 350 from the buffer 410, and store it into the data field 354.

The MTSIF transmitter 302 may also be operable to support cascading additional demodulator blocks, such as when the MTSIF 320 allows for communication more data than what is communicated via the demod_input$_1$-demod_input$_M$. In this regard, the cascading MTSIF receiver 406 may receive, for example, MTSIF and/or non-MTSIF based streams outputted by other instance of the multi-demod chip block 300. The data may then be forwarded to the buffer write port 412b, which may write that data into the data buffer 410. In this regard, dedicated partitions of the data buffer 410 may be allocated for cascading operations, and the buffered data may be utilized to generate corresponding packets 350 for communication via the MTSIF 320, in a substantially similar manner as with data corresponding to the demod_input$_1$-demod_input$_M$.

Figure 4B:
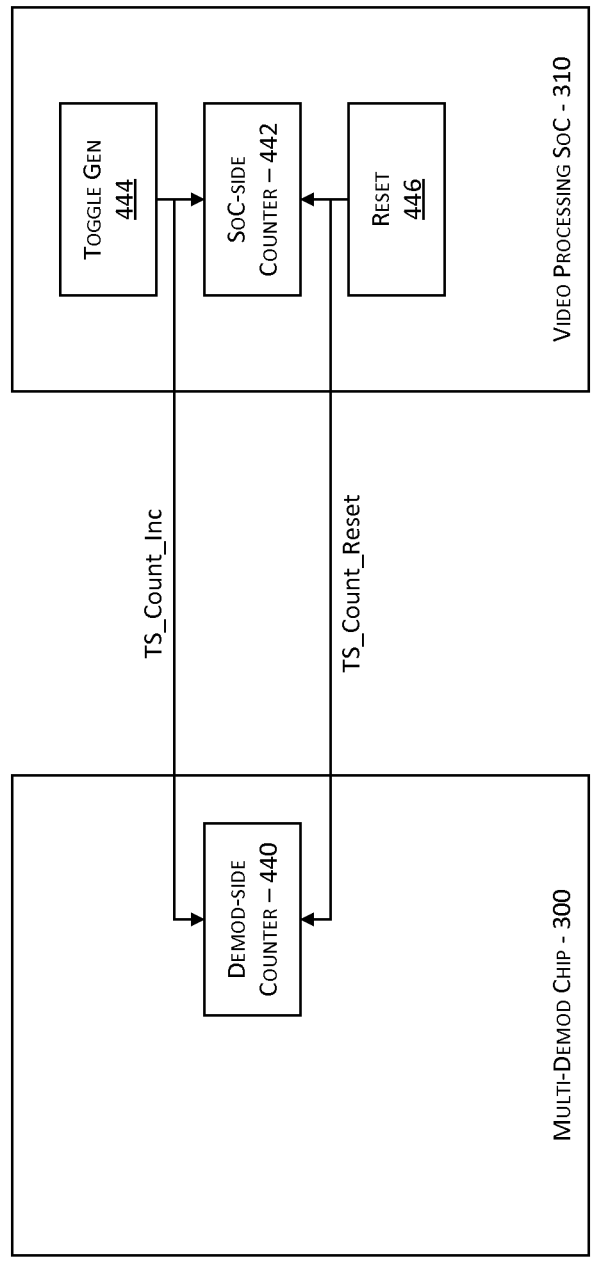
FIG. 4B is a block diagram illustrating an exemplary counter synchronization between multi-chip demodulation module and a video processing system-on-chip (SoC), in accordance with an embodiment of the invention.

FIG. 4B is a block diagram illustrating an exemplary counter synchronization between multi-chip demodulation module and a video processing system-on-chip (SoC), in accordance with an embodiment of the invention. Referring to FIG. 4B, there is shown the multi-demod chip block 300 and the video processing SoC 310 of FIG. 3A. Also shown in FIG. 4B are a demod-side counter 440, a SoC-side counter 442, a toggle generator 444, and a reset block 446.

The demod-side counter 440 may comprise suitable logic, circuitry, interfaces and/or code that may be operable to generate values which may be utilized to set timestamps incorporated into packets communicated by the multi-demod chip block 300 via the MTSIF 320. The SoC-side counter 442 may comprise suitable logic, circuitry, interfaces and/or code that may be operable to generate values that are compared against timestamps in packets received by the video processing SoC 310 via the MTSIF 320 to match particular packets.

The toggle generator 444 may comprise suitable logic, circuitry, interfaces and/or code that may be operable to trigger clock cycles. In this regard, each triggering of clock cycle may be utilized to concurrently increment the timestamp counters on both sides of the MTSIF 320 This may be done, for example, by, at the same time, sending TS_count_inc signal 320d to the demod-side counter 440 and an internal message to increment the SoC-side counter 442, when a new clock cycle is a trigger via the toggle generator 444.

The reset block 446 may comprise suitable logic, circuitry, interfaces and/or code that may be operable to reset the demod-side counter 440 and/or the SoC-side counter 442. In this regard, the reset block 446 may be operable to concurrently reset the timestamp counters on both sides of the MTSIF 320. This may be done, for example, by, at the same time, sending TS_count_rst signal 320e to the demod-side counter 440 and an internal message to reset the SoC-side counter 442.

In operation, the demod-side counter 440 and SoC-side counter 442 may utilized to ensure that packets communicated via the MTSIF 320 are consumed in the video processing SoC 310 in the same order in which they were communicated from the multi-demod chip block 300. In this regard, the demod-side counter 440 may be utilized to set the timestamp field 352d in the packets 350 communicated via the MTSIF 320. The SoC-side counter 442 may be utilized to generate values that may be compared against timestamps in received packets 350, to determine correct order of communication. The TS_count_inc signal 320d and/or the TS_count_rst signal may be utilized to synchronize operations of the demod-side counter 440 and SoC-side counter 442. Incrementing the counters may be concurrently triggered by the toggle generator 444. In this regard, triggering counter increment on the demod-side may be performed by communicating a TS_count_inc signal 320d to the demod-side counter 440 in the multi-demod chip block 300 at the same time that the toggle generator 444 is triggering counter increment in the SoC-side counter 442 within the video processing SoC 310. Similarly, the counters may be reset at the same time by reset block 446. In this regard, triggering counter reset on the demod-side may be performed by communicating a TS_count_rst signal 320e to the demod-side counter 440 in the multi-demod chip block 300 at the same time that the reset block 446 is triggering a counter reset in the SoC-side counter 442 within the video processing SoC 310.

Figure 5:
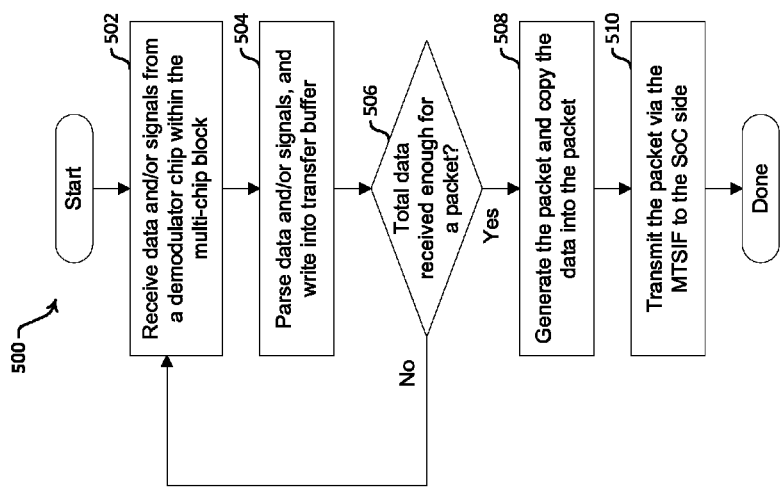
FIG. 5 is a flow chart that illustrates exemplary steps for utilizing multiplexed demod-SoC interface during video processing, in accordance with an embodiment of the invention.

FIG. 5 is a flow chart that illustrates exemplary steps for utilizing a multiplexed demod-SoC interface for video processing, in accordance with an embodiment of the invention. Referring to FIG. 5, there is shown a flow chart 500 comprising a plurality of exemplary steps that may be utilized by a multiplexed demod-SoC interface for video processing.

In step 502, data and/or signals may be received from a demodulator chip within the multi-chip block. In step 504, the received data and/or signals may be parsed and written into a transfer buffer. In step 506, a determination of whether total data received and buffered is sufficient or a packet may be performed. In instances where it may be determined that not enough data has been received from a particular demodulator chip, the plurality of exemplary steps may return to step 502. In instances where it may be determined that enough data has been received from particular demodulator chip, the plurality of exemplary steps may proceed to step 508. In step 508, a packet may be generated comprising the buffered data. In step 510, the packet may be communicated via the MTSIF to the SoC side.

Various embodiments of the invention may comprise a method and system for multiplexed transport interface between demodulators (DEMODs) and set-top box (STB) system-on-chips (SoCs). The interface 240 between the DEMOD block 206 and the video processing core 210, which may be utilized in communicating data and/or signals associated with demodulation operations performed by the DEMOD block 206, may be configured, by the host processor 202 for example, as multiplexed transport interface (MTSIF) 320 to enable multiplexed based communication of demodulation related data, such as in instances where the DEMOD block 206 is implemented as a multi-demod chip block 300. In this regard, the MTSIF 320 may enable concurrent demodulation of the plurality of video streams 230a-230n via at least a portion of the plurality of demodulator chips $250_1$-$250_M$ within the multi-demod chip block 300, by multiplexing communication of demodulated data corresponding to the demodulator chips $250_1$-$250_M$ into the data signal 320c in the MTSIF 320 for example. The concurrent use of the plurality of demodulator chips $250_1$-$250_M$ may enable concurrent tuning to a plurality of broadcast channels at the same time. Use of the MTSIF 320 may enable standardizing the demodulation interfacing functions in the multi-demod chip block 300 and/or the video processing SoC 310, regardless of the actual number of demodulator chips $250_1$-$250_M$ utilized. Standardizing the demodulation interfacing functions may enable fixing the number of interconnect pins in the MTSIF 320, and/or reducing total number of interconnect pins between the multi-demod chip block 300 and the video processing SoC 310 regardless of the actual number of demodulator chips $250_1$-$250_M$ used.

The MTSIF 320 may support communication of one or more control signals, such as the clock signal 320a, the sync signal 320b, the TC_count_inc signal 320d, and/or the TC_count_rst signal 320e. These signals may be utilized to control and/or manage operations of the multi-demod chip block 300, the video processing SoC 310, and/or interactions with the MTSIF 320. Communication via the MTSIF 320 between the multi-demod chip block 300 and the video processing SoC 310 may be synchronized. In this regard, the synchronization may be performed based on use of timestamps that may be incorporated within packets communicated via the MTSIF 320. Furthermore, the synchronization of communication via the MTSIF 320 may comprise utilizing the timestamp counters 440 and 442, in the multi-demod chip block 300 and video processing SoC 310, respectively, to track and/or match the timestamps incorporated into the communicated packets. In this regard, the timestamp counters 440 and 442 may be concurrently incremented and/or reset, using control signal communicated via the MTSIF 320. The MTSIF 320 may support coupling additional demodulator block external to the multi-demod chip block 300. In this regard, at least a portion of data communicated by the additional demodulator chips may be multiplexed via the MTSIF 320.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multiplexed transport interface between demodulators (DEMODs) and set-top box (STB) system-on-chips (SoCs).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A demodulation device, comprising:
   circuitry configured to:
   demodulate a plurality of modulated input video data streams into demodulated video data via a plurality of corresponding demodulators;
   multiplex the demodulated video data generated by the plurality of demodulators;

output the multiplexed demodulated video data as packets via a multiplexed transport interface comprising a plurality of interface pins;
timestamp the packets using timestamps generated by a first timestamp counter; and
output at least one timestamp counter synchronization signal via the multiplexed transport interface to synchronize a second timestamp counter with the first timestamp counter, the at least one timestamp counter synchronization signal comprising a timestamp counter increment signal and a timestamp counter reset signal;
the timestamp counter increment signal, the timestamp counter reset signal, a serial clock signal, a serial data signal, and a synchronization signal communicated via the plurality of interface pins.

2. The device of claim 1, wherein individual demodulators of the plurality of demodulators utilize a respective transport interface for communicating one or more of a respective serial clock signal or a serial data signal.

3. The device of claim 1, wherein the plurality of modulated input video data streams is encoded into demodulated video data by the plurality of demodulators in a first type of transport packet, and the packets output via the multiplexed transport interface are encoded in a second type of transport packet, the second type of transport packet being larger than the first type of transport packet.

4. The device of claim 1, wherein the circuitry is further configured to remove data associated with a per-demodulator transport interface from the corresponding demodulated video data before multiplexing.

5. The device of claim 1, wherein each of the timestamp counter increment signal, the timestamp counter reset signal, the serial clock signal, the serial data signal, and the synchronization signal are output via a respective pin of the multiplexed transport interface.

6. A method, comprising:
receiving, via a multiplexed transport interface, a clock signal, a synchronization signal, a data signal comprising packets of multiplexed demodulated video data, and at least one timestamp counter synchronization signal comprising a timeslot count increment signal and a timeslot count reset signal, wherein the packets are time stamped;
matching timestamps utilized by the packets based at least in part on the timestamp counter;
operating the timestamp counter based at least in part on the at least one timestamp counter synchronization signal received via the multiplexed transport interface; and
providing a plurality of video data streams by demultiplexing the multiplexed demodulated video data.

7. The method of claim 6, further comprising decoding the plurality of video data streams in a single video processing chip.

8. The method of claim 6, further comprising responsive to receiving the at least one timestamp counter synchronization signal, incrementing the timestamp counter or resetting the timestamp counter.

9. A system, comprising:
a multiplexed transport interface configured to communicate a plurality of demodulated video data streams as a multiplexed data signal, the multiplexed transport interface including circuitry configured to communicate:
a clock signal;
a synchronization signal;
a multiplexed data signal including packets of multiplexed demodulated video data; and
a timeslot count increment signal and a timeslot count reset signal for synchronizing operation of a demultiplexer-side counter with a multiplexer-side counter.

10. The system of claim 9, further comprising video processing circuitry configured to transmit the clock signal, the synchronization signal, the data signal, the timeslot count increment signal, and the timeslot count reset signal from the multiplexed transport interface.

11. The system of claim 9, wherein the multiplexed transport interface is configured to receive the plurality of demodulated video data streams in parallel from a plurality of demodulators.

12. The system of claim 9, wherein the multiplexed transport interface includes parser circuitry configured to remove data from the plurality of demodulated video data streams, the removed data facilitating direct transport of individual ones of the plurality of demodulated video data streams to video processing circuitry.

13. The system of claim 9, wherein individual ones of the packets comprise a header portion and a data portion.

14. The system of claim 13, wherein the header portion comprises a type field that identifies a type of data encoded in the data portion.

15. The system of claim 13, wherein the header portion comprises an identifier field that identifies a particular one of a plurality of demodulators that generate the plurality of demodulated video data streams.

16. The system of claim 13, wherein the header portion comprises a timestamp field.

17. A demodulation device, comprising:
a plurality of demodulators configured to each demodulate a respective modulated input video data stream from a plurality of modulated input video data streams, wherein each of the demodulators includes a transport interface having at least one interconnect pin;
multiplexed transport interface transmission circuitry, including a number of interconnect pins, configured to:
receive demodulated video data generated by a variable number of the plurality of demodulators while maintaining a same number of multiplexed transport interface interconnect pins independent of a number of demodulators generating demodulated video data,
multiplex the demodulated video data generated by the plurality of demodulators, and
output the multiplexed demodulated video data as packets via a multiplexed transport interface; and
wherein the number of multiplexed transport interface interconnect pins is less than a combined total of per-demodulator transport interface interconnect pins.

18. A demodulation device, comprising:
a plurality of demodulators configured to each demodulate a respective modulated input video data stream from a plurality of modulated input video data streams, wherein each of the demodulators includes a transport interface;
multiplexed transport interface transmission circuitry, including a number of interconnect pins, configured to:
receive demodulated video data generated by a variable number of the plurality of demodulators while maintaining the same number of multiplexed transport interface interconnect pins regardless of the number of demodulators actively generating demodulated video data,
multiplex the demodulated video data generated by the plurality of demodulators, and
output the multiplexed demodulated video data as packets via a multiplexed transport interface; and wherein the multiplexed transport interface is configured to communicate data at a clock frequency greater than a clock frequency of each demodulator transport interface.

19. The demodulation device of claim 18, wherein the multiplexed transport interface is further configured to communicate larger packets of data than packets communicated by each demodulator transport interface.

20. The demodulation device of claim 17, wherein the multiplexed transport interface is further configured to communicate data at a clock frequency greater than a clock frequency of each demodulator transport interface.

21. The demodulation device of claim 17, wherein the multiplexed transport interface is further configured to output at least one timestamp counter synchronization signal.

22. The demodulation device of claim 21, wherein the at least one timestamp counter synchronization signal comprises a timestamp counter increment signal and a timestamp counter reset signal.

23. The demodulation device of claim 17, wherein the packets are time stamped.

24. The demodulation device of claim 17, wherein a header of an output packet comprises an identification of a demodulator of the plurality of demodulators corresponding to demodulated video data carried by the packet.

* * * * *